(12) United States Patent
Walker et al.

(10) Patent No.: US 11,052,561 B2
(45) Date of Patent: Jul. 6, 2021

(54) CUT FOOD DENESTER

(71) Applicant: J.R. Simplot Company, Boise, ID (US)

(72) Inventors: David Bruce Walker, Meridian, ID (US); Allen J. Neel, Nampa, ID (US); James Englar, Nampa, ID (US)

(73) Assignee: J.R. Simplot Company, Boise, ID (US)

( * ) Notice: Subject to any disclaimer, the term of this patent is extended or adjusted under 35 U.S.C. 154(b) by 109 days.

(21) Appl. No.: 16/016,421

(22) Filed: Jun. 22, 2018

(65) Prior Publication Data
US 2019/0001517 A1 Jan. 3, 2019

Related U.S. Application Data

(60) Provisional application No. 62/527,737, filed on Jun. 30, 2017.

(51) Int. Cl.
| | |
|---|---|
| *B26D 7/06* | (2006.01) |
| *B26D 7/32* | (2006.01) |
| *A23L 19/12* | (2016.01) |
| *A23N 15/00* | (2006.01) |
| *B26D 3/11* | (2006.01) |

(Continued)

(52) U.S. Cl.
CPC .......... *B26D 7/0658* (2013.01); *A23L 19/14* (2016.08); *A23N 15/00* (2013.01); *B26D 3/11* (2013.01); *B26D 3/26* (2013.01); *B26D 7/32* (2013.01); *B26F 3/004* (2013.01); *A23V 2002/00* (2013.01); *B26D 2210/02* (2013.01)

(58) Field of Classification Search
CPC .......... B26D 7/0658; B26D 3/11; B26D 3/26; B26D 7/32; B26D 2210/02; B26F 3/004; A23L 19/14; A23N 15/00; A23V 2002/00

USPC .................. 99/330, 348, 352, 472, 537, 538
See application file for complete search history.

(56) References Cited

U.S. PATENT DOCUMENTS

| | | | |
|---|---|---|---|
| 3,361,173 A | 1/1968 | Lamb | |
| 4,450,757 A * | 5/1984 | Alfio ...................... | A47J 27/18 |
| | | | 126/374.1 |

(Continued)

FOREIGN PATENT DOCUMENTS

GB        2543797 A        1/2000

OTHER PUBLICATIONS

International Searching Authority; International Search Report and Written Opinion for PCT Application No. PCT/US2018/039346 dated Jan. 14, 2019.

(Continued)

*Primary Examiner* — Phuong T Nguyen
(74) *Attorney, Agent, or Firm* — Parsons Behle & Latimer (57) ABSTRACT

A system for separating cut food products includes a flow inlet, a flow outlet, and at least one drum connecting the flow inlet and the flow outlet. The flow inlet may be oriented to direct the cut food product tangentially into the at least one drum. The flow inlet may be oriented to direct the cut food product into the at least one drum at a right angle to a longitudinal axis of the at least one drum. The at least one drum may be a plurality of drums including a first drum having the flow inlet and a second drum having the flow outlet. The system may include a passageway providing fluid communication from the first drum to the second drum. The passageway may include a tapered section. The flow inlet may be aligned with the flow outlet.

14 Claims, 6 Drawing Sheets

(51) Int. Cl.
  *B26D 3/26*      (2006.01)
  *B26F 3/00*      (2006.01)

(56) References Cited

U.S. PATENT DOCUMENTS

| | | | | |
|---|---|---|---|---|
| 5,568,755 | A * | 10/1996 | Mendenhall | B23D 35/008 |
| | | | | 406/195 |
| 2006/0182866 | A1* | 8/2006 | Fava | A21C 1/065 |
| | | | | 426/557 |
| 2014/0360326 | A1* | 12/2014 | Walker | B26D 7/0658 |
| | | | | 83/48 |
| 2017/0072581 | A1 | 3/2017 | Walker et al. | |
| 2017/0203987 | A1* | 7/2017 | Mcmahon | B02C 25/00 |

OTHER PUBLICATIONS

Intellectual Property Office of New Zealand; First Examination Report for Patent Application No. 760391 dated May 29, 2020.
IP Australia; Examination Report No. 1; Australian Patent Application No. 2018292278 dated Oct. 1, 2020.
Intellectual Property Office of India; First Examination Report; Indian Patent Application No. 202017001431 dated Aug. 31, 2020.
Canadian Intellectual Property Office; Office Action for Canadian Patent Application No. 3,067,618 dated Mar. 2021.
Japan Patent Office; Office Action for Japanese Patent Application No. 2019-572430 dated Mar. 18, 2021.
National Institute of Industrial Property; Office Action for Chilean Application No. 201903841 dated Apr. 15, 2021.

\* cited by examiner

CUT FOOD DENESTER

RELATED APPLICATIONS

This application claims the benefit of U.S. Provisional Patent Application Ser. No. 62/527,737, filed on Jun. 30, 2017 and entitled "Cut Food Denester," the contents of which are incorporated herein by reference in its entirety.

FIELD OF THE DISCLOSURE

The embodiments described herein relate generally to a system for separating food products. In particular, the disclosure relates to a denester for cut food products.

BACKGROUND

Generally, fries and other sliced food products are cut by use of a water knife and subsequently processed by blanching, drying, battering, frying, and/or freezing. In many fry products, such as straight-cut fries, the fries easily separate. However, with the development of more unique fry shapes, the food product may retain its shape after cutting and require manual manipulation to separate the fries from each other. The need for manual separation can substantially increase manufacturing costs and/or reduce throughput of a cutting system. Other disadvantages may exist.

SUMMARY

The present disclosure is directed to systems and methods for separating cut food products that overcomes and/or mitigates some of the problems and disadvantages discussed above.

An embodiment of a system for separating a cut food product into a plurality of food product pieces includes a flow inlet, a flow outlet, and at least one drum connecting the flow inlet and the flow outlet. The cut food product has a plurality of nested food product pieces. The flow inlet is positionable to receive a cut food product to be separated. The flow inlet may receive a fluid, such as water, from a water knife. The flow inlet and the flow outlet may be positioned to create a cyclonic flow path through the at least one drum. The flow inlet may be aligned with a discharge of a knife block or a water knife. The flow inlet may be oriented to direct the cut food product tangentially into the at least one drum. The flow inlet may be oriented to direct the cut food product into the at least one drum at a right angle to a longitudinal axis of the at least one drum. The flow inlet may be positioned on a top portion of the at least one drum. The at least one drum may be a plurality of drums including a first drum and a second drum. The flow inlet may be positioned on a top portion of the first drum. The flow inlet may be positioned on the first drum and the flow outlet may be positioned on the second drum. The cyclonic flow path may be configured to separate the plurality of nested food product pieces into a plurality of food product pieces, substantially each of which are individually separated from one another.

The system may include a passageway providing fluid communication from the first drum to the second drum. The passageway may include a first end connected to the first drum and a second end connected to the second drum. The passageway may include a tapered section between the first end and the second end that narrows toward the second end. The flow inlet may be aligned with the flow outlet. The first drum may have an inner diameter of approximately twelve inches. The first drum may have a length of approximately twenty-four inches. The first drum may include a first drain valve. The second drum may include a second drain valve. The system may include a bypass flow path having a bypass inlet and a bypass outlet. The system may be pivotable between a first position and a second position. The flow inlet may be aligned with the discharge (an inlet axis) in the first position and the bypass inlet may be aligned with the inlet axis in the second position. The at least one drum may have a longitudinal axis that is perpendicular to gravitational forces.

An embodiment of a method for separating a cut food product into a plurality of food product pieces includes directing a flow of fluid along a fluid flow path of a denester. The denester includes at least one drum. The flow of fluid is directed tangentially into the at least one drum. The flow of fluid may be from a water knife. The method includes rotating the cut food product along a length of the at least one drum, wherein the cut food product is separated into a plurality of food product pieces, and removing the plurality of food product pieces from the at least one drum through a flow outlet. Substantially each of the plurality of food product pieces that are nested within each other are individually separated from one another.

The method may include directing the cut food product along the fluid flow path tangentially into the at least one drum at a right angle to a longitudinal axis of the at least one drum. The method may include removing the plurality of food product pieces from the drum through a tangentially oriented flow outlet.

The at least one drum may include a first drum and a second drum. The rotating the cut food product along a length of the at least one drum may include rotating the cut food product along a length of the first drum, passing the cut food product into the second drum, and rotating the cut food product along a length of the second drum. The passing the cut food product into the second drum may include passing the cut food product along a passageway from the first drum to the second drum. The passageway may be tapered and increase a velocity of the cut food product as it is passed into the second drum. The cut food product may be a potato. The potato may be cut into a plurality of helical wedges. The method may include cutting the potato into the plurality of helical wedges before the flow of fluid carrying the potato is directed tangentially into the at least one drum. The rotating the cut food product along the length of the at least one drum may comprise causing a portion of the flow of fluid closest to an interior wall of the at least one drum to move at a faster rate than a portion of the flow of fluid in a center of the at least one drum.

The denester may include a bypass flow path. The method may include moving the denester, wherein the movement of the denester orients the bypass flow path in place of the fluid flow path. The denester may include a flow inlet oriented along a first axis. The bypass flow path may include a bypass inlet oriented along a second axis. The second axis may be parallel to the first axis. The moving the denester may comprise pivoting the denester between a bypass position and an engaged position. The flow inlet is in communication with a discharge of a knife block or a water knife in the engaged position. The bypass inlet is in communication with the discharge in the bypass position.

An embodiment of a system for separating a cut food product into a plurality of food product pieces, includes a plurality of drums, a flow inlet, a flow outlet, and a flow path. The cut food product has a plurality of nested food product pieces. The plurality of drums includes a first drum and a second drum. The flow inlet is positioned on the first drum. The flow inlet is configured to be placed into fluid communication with a discharge of a knife block or a water knife. The flow outlet is positioned on the second drum. The flow path extends from the flow inlet to the flow outlet through the plurality of drums. The flow path is configured to impart turbulence and centripetal acceleration to a cut food product received through the flow inlet. The flow path may be configured to separate the plurality of nested food product pieces into a plurality of food product pieces, substantially each of which are individually separated from one another.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DESCRIPTION

Figure 1:
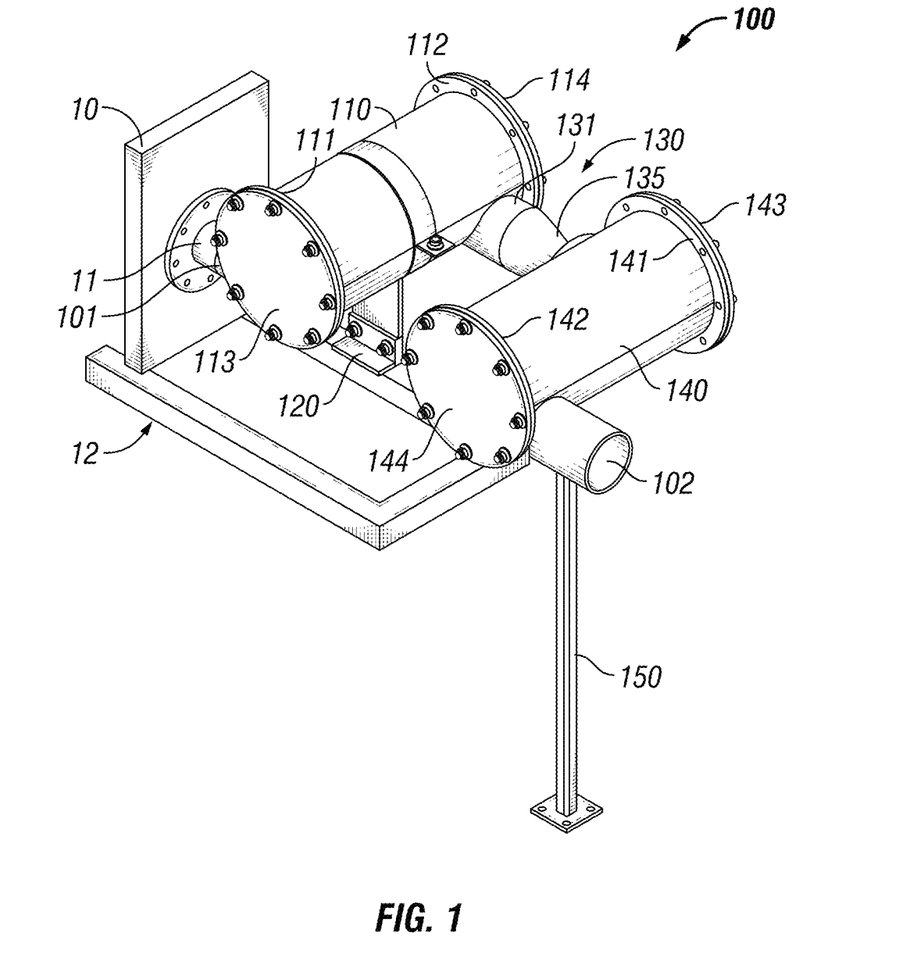
FIGS. 1-3 show an embodiment of a denester positioned adjacent to a water knife.
Figure 2:
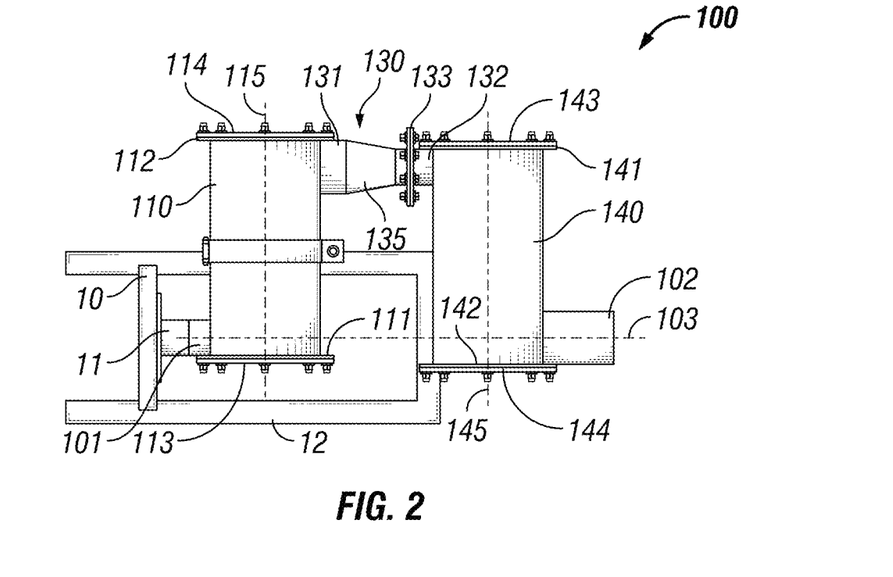
Figure 3:
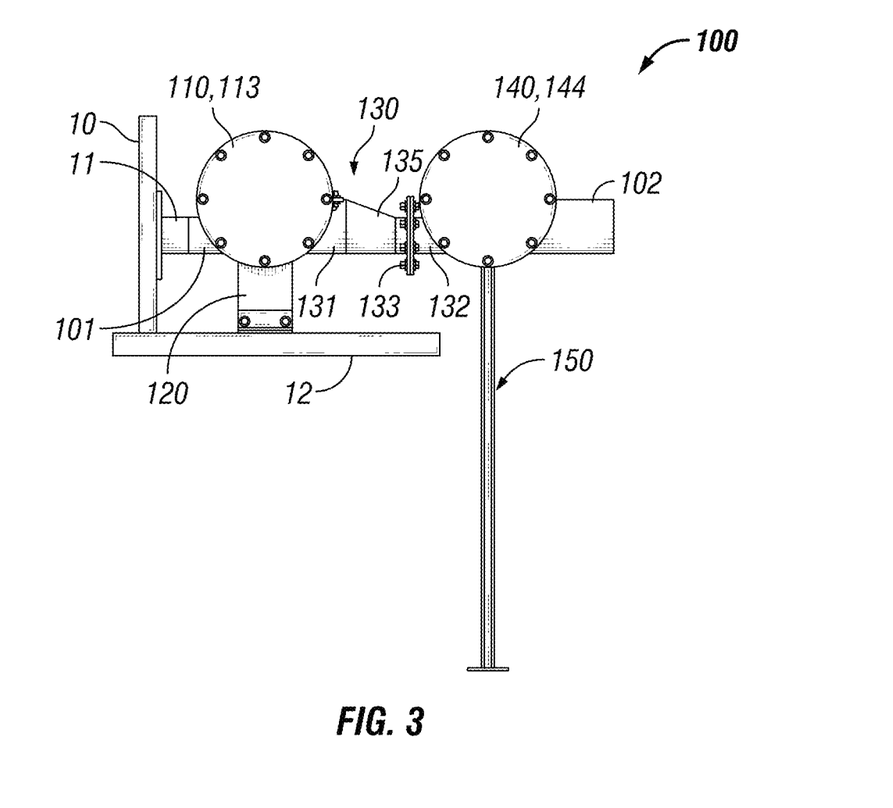

FIGS. 1-3 show an embodiment of a denester 100 for separating cut food products. The denester 100 is positioned to receive cut food products from a discharge 11 of a water knife 10. A knife block, or other cutting device, may be used in place of the water knife 10. A supplemental fluid stream may also be used in some embodiments. Although the water knife 10 and discharge 11 have been show adjacent to the denester 100, it is appreciated that a longer flow path of discharge 11 may be used to redirect the cut food product to the denester 100 and the denester 100 is located later in a processing line than the cutting device. For example, the discharge 11 may include a portion that temporarily holds cut food products to be separated and/or the discharge 11 may receive cut food products from multiple cutting devices. By way of example, the water knife 10 may be a knife fixture such as described in U.S. Pat. No. 9,089,987, which issued on Jul. 28, 2015 and titled "Rotary Knife Fixture For Cutting Spiral, Textured Potato Pieces," or U.S. patent application Ser. No. 14/868,987, which published on Jan. 21, 2016 as U.S. Pat. Pub. No. 2016/0016326 and titled "System For Cutting Spiral Shaped Pieces," or U.S. patent application Ser. No. 14/937,271, which published as on Mar. 16, 2017 as U.S. Pat. Pub. No. 2017/0072581 and titled "Flow-Propelled Rotary Knife" the disclosures of which are incorporated by reference in their entireties. As may be appreciated by these disclosures, food products, such as potatoes are cut into helical wedge shapes. The helical wedge shapes are intertwined around one another (nested within each other) and may exit the water knife with the appearance of a full potato. In other words, a cut food product comprise a plurality of food product pieces nested within each other. Although the embodiments described herein may make reference to the helical wedge shapes, it is appreciated that this disclosure may also be applicable to the separation of other types of unique cuts that would otherwise use manual labor to separate. By way of example, cut food shapes that may benefit from this disclosure include, but are not limited to, those shown and described in U.S. Design Pat. Nos. D640036, D716517, D716518, D716519, D716520, D723241, D723242, D723243, D766542, and Registered Community Design Nos. 003135722-0001, 003154293-0001, and 003164102-0001.

In contrast to known systems, which tend to minimize turbulence at the discharge 11 of a water knife 10 to prevent product damage, the denester 100 is configured to impart friction, directed turbulence, and centripetal acceleration to the cut food products in order to separate the individual pieces of the food products. The denester 100 may include no moving parts and use only the flow of a fluid, such as water, carrying the food products through the water knife 10. The denester 100 includes one or more drums, such as a plurality of drums to impart turbulence and centripetal acceleration to the cut food products in order to separate the nested food products. As shown in FIG. 1, the denester 100 includes a plurality of drums including a first drum 110 and a second drum 140 with a passageway 130 therebetween. The first drum 110 and the second drum 140 may have a substantially cylindrical shape. As used herein, the term "substantially" means at least almost entirely. For instance, substantially each of the previously nested food product pieces may be individually separated from one another when at least one of the food product pieces is not nested with one or more of the other food product pieces. In quantitative terms, "substantially" means at least 80% of a stated reference (e.g., quantity or shape). Furthermore, an object is cylindrical if it appears as such to an ordinary user, recognizing that, for example, manufacturing processes may create tolerances in the shape or design and the object may include surface features or mechanisms for which the surface is not perfectly smooth or symmetrical. In some embodiments, one or both of the drums 110, 140 may be another shaped chamber. For example, one or both of the drums 110, 140 may form a conical frustum or a hexagonal prism. The first drum 110 includes a flow inlet 101 that receives water and the food products from the water knife 10 via discharge 11. The flow inlet 101 is configured to be placed into fluid communication with the discharge 11 of a water knife 10. The flow inlet 101 may be oriented to direct the flow in a direction tangential to the interior diameter of the first drum 110 (best shown in FIG. 3). The flow inlet 101 may also be oriented approximately at a right angle to a longitudinal axis 115 of the first drum 110 (best shown in FIG. 2). As used herein, the term approximately means close in value, but not necessarily precise, such as +/−10%.

The first drum 110 includes a first end 111 and a second end 112. The first end 111 and the second end 112 may each be a flanged end, as shown. The longitudinal axis 115 extends from the first end 111 to the second end 112 of the first drum. A first end cap 113 may be affixed to the first end 111 and a second end cap 114 may be affixed to the second end 112. One or more of the end caps 113, 114 may be made of a substantially transparent material, such as a polycarbonate or glass, that enables monitoring of the interior volume of the first drum 110. The end caps 113,114 may include a gasket or seal to provide a water-tight connection. The first drum 110 may be supported upon a frame 12 of the water knife 10 via a support 120.

The second drum 140 includes a first end 141 and a second end 142. The first end 141 and the second end 142 may each be a flanged end, as shown. A first end cap 143 may be affixed to the first end 141 and a second end cap 144 may be affixed to the second end 142. One or more of the end caps 143, 144 may be made of a substantially transparent material, such as a polycarbonate or glass, that enables monitoring of the interior volume of the second drum 140. The end caps 143,144 may include a gasket or seal to provide a water-tight connection. The second drum 140 may be supported upon a support arm 150. The second drum 140 includes a flow outlet 102 that discharges water and separated food product pieces from the second drum 140. The flow outlet 102 may be oriented tangentially to the interior diameter of the second drum 140 to avoid damaged to the food product pieces (best shown in FIG. 3). In some embodiments, the flow inlet 101 of the first drum 110 and the flow outlet 102 of the second drum 140 may be aligned along the same axis 103 (shown in FIG. 2). It may be desirable for the flow inlet 101 and the flow outlet 102 to be aligned along the same axis 103 to decrease the length of a processing line and/or to more readily install the denester 100 within an existing processing line.

The denester 100 includes a passageway 130 connecting the first drum 110 to the second drum 140. The passageway 130 may extend from the second end 112 of the first drum 110 to the first end 141 of the second drum 140. As shown, the passageway 130 may include a first end 131 that is oriented at a right angle to the longitudinal axis 115 of the first drum 110 (best shown in FIG. 2) and/or tangentially to the interior diameter of the first drum 110 (best shown in FIG. 3). A second end 132 of the passageway 130 (shown in FIG. 2) may be oriented at a right angle to a longitudinal axis 145 of the second drum 140 (best shown in FIG. 2) and/or tangentially to the interior diameter of the second drum 140 (best shown in FIG. 3). The longitudinal axis 145 extends from the first end 141 to the second end 142 of the first drum 110. The passageway 130 may include a flanged portion 133 (shown in FIG. 2) to facilitate assembly of the first end 131 to the second end 132. The passageway 130 may include a tapered section 135 that extends toward the second end 132 such that water flowing through the passageway 130 must pass through a smaller cross-sectional area and a velocity of the flow is increased. The increased flow velocity increases the centripetal acceleration experienced by the cut food product within the second drum 140. The increased centripetal acceleration may assist with separating the cut food product into distinct food product pieces.

With reference to FIG. 1, a food product, such as a potato, is cut by the water knife 10 and continues in a fluid flow path through the discharge 11 and into the flow inlet 101 of the first drum 110. The flow within the first drum 110 creates a cyclonic flow path from the first end 111 to the second end 112 of the first drum 110. Referring to FIG. 3, with the flow inlet 101 positioned tangentially to the bottom side of the interior diameter of the first drum 110, the flow operates in a counterclockwise direction as it moves from the first end 111 to the second end 112 of the first drum 110. Depending upon the volume flow rate of the water, the first drum 110 may be substantially filled with water and the tangential orientation of the flow may cause the portion of the flow closest to the interior walls to move at a faster rate than a portion of the flow in a center of the first drum 110. As a result, the cut potato may tumble as it rotates through the cyclonic flow path.

Once the potato reaches the second end 112 of the first drum 110, it is received into the first end 131 of the passageway 130. The first end 131 of the passageway 130 may have a greater diameter than the second end 132 of the passageway 130. The greater diameter may assist with orienting the potato into the passageway 130 and inhibit a blockage from forming. As the potato travels through the passageway 130, the tapered section 135 of the passageway 130 increases the velocity of the flow as the potato enters the second drum 140.

The flow within the second drum 140 creates a cyclonic flow path from the first end 141 to the second end 142 of the second drum 140. Referring to FIG. 3, with second end 132 of the passageway 130 is positioned tangentially to the bottom side of the interior diameter of the second drum 140, the flow operates in a counterclockwise direction as it moves from the first end 141 to the second end 142 of the second drum 140. As with the first drum 110, depending upon the volume flow rate of the water, the second drum 140 may be substantially filled with water and the tangential orientation of the flow may cause the portion of the flow closest to the interior walls to move at a faster rate. As a result, the cut potato may tumble as it rotates through the cyclonic flow path. Once the potato reaches the second end 142 of the second drum 140, the separated potato pieces are discharged through the flow outlet 102 for further processing.

By way of example, a flow rate of 650 gallons per minute (GPM) was determined to be more effective at separating product than a flow rate of 450 GPM. In addition, a drum having an interior diameter of 12 inches was determined to have better performance than a drum having an annular flow space between a 12 inches drum installed within a drum having an interior diameter of 18 inches, which was determined to have better performance than a drum having an interior diameter of 18 inches. The use of two drums having an interior diameter of 12 inches and a length of 24 inches with a flow rate of 650 GPM was found to have a separation rate of more than 99%. Also by way of example, the flow inlet 101 may have an inner diameter of approximately 4 inches, the first end 131 of the passageway 130 may have an inner diameter of approximately 6 inches, the second end 132 of the passageway 130 may have an inner diameter of approximately 4 inches, and/or the flow outlet 102 may have an inner diameter of approximately 6 inches.

Figure 4:
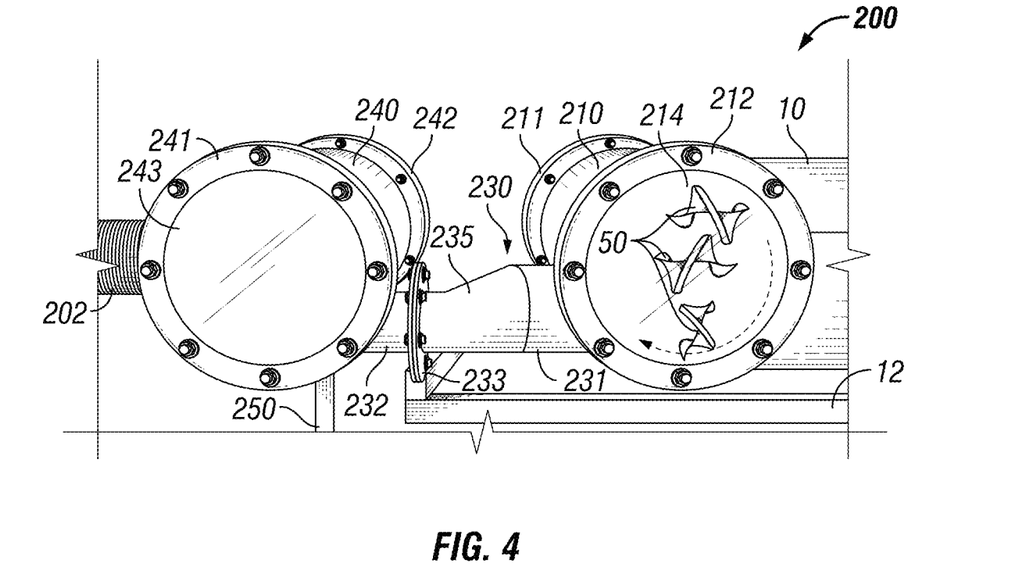
FIGS. 4 and 5 show an embodiment of a denester positioned adjacent to a water knife.
Figure 5:
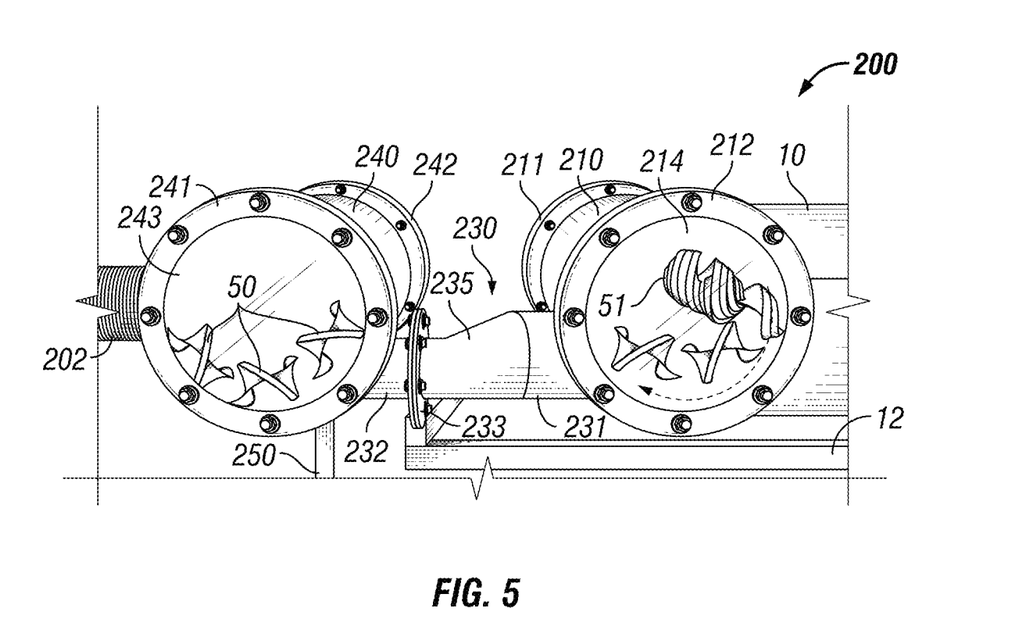

FIGS. 4 and 5 show an embodiment of a denester 200 positioned to receive water and cut food products from a water knife 10. The denester 200 includes a first drum 210 and a second drum 240 with a passageway 230 therebetween. The first drum 210 includes a first end 211 and a second end 212. A transparent end cap 214 is affixed to the second end 212. The first drum 210 is supported upon a frame 12 of the water knife 10 via a support (not shown). The second drum 240 includes a first end 241 and a second end 242. A transparent end cap 243 is affixed to the first end 241. The second drum 240 is supported upon a support arm 250. The second drum 240 includes a flow outlet 202 that discharges water and separated food product pieces from the second drum 240. The flow outlet from the water knife 10 and the flow outlet 202 of the second drum 240 are aligned along the same axis.

The denester 200 includes a passageway 230 extending from the second end 212 of the first drum 210 to the first end 241 of the second drum 240. The passageway 230 includes a first end 231 that is oriented tangentially to the interior diameter of the first drum 210. A second end 232 of the passageway 230 is oriented tangentially to the interior diameter of the second drum 240. The first end 231 and the second end 232 of the passageway 230 are connected via a flanged connector 233. The passageway 230 includes a tapered section 235 that extends toward the second end 232 such that water flowing through the passageway 230 must pass through a smaller cross-sectional area and the velocity of the flow is increased. The larger diameter of the first end 231 of the passageway 230 inhibits a blockage from forming when unseparated portions of a food product are received sideways into the passageway 230. The increased flow velocity increases the centripetal acceleration experienced by the cut food product within the second drum 240.

As shown in FIG. 4, a potato 50 was cut by the water knife 10 and carried along a cyclonic flow path from the first end 211 to the second end 212 of the first drum 210. The potato 50 has been separated into a plurality of pieces and is about to complete a clockwise rotation (viewed from the second end 212 of the first drum 210) and be received into the passageway 230. The potato 50 has fully separated by movement along the cyclonic flow path within the first drum 210. In FIG. 5, the pieces of the potato 50 have entered the second drum 240 and are moving toward the flow outlet 202. A second potato 51 was cut by the water knife 10 and carried along a cyclonic flow path from the first end 211 to the second end 212 of the first drum 210. A portion of the second potato 51 has been separated by movement along the cyclonic flow path within the first drum 210, but another portion of the second potato 51 remains intertwined. The second potato 51 will continue its clockwise rotation (viewed from the second end 212 of the first drum 210) and be received into the passageway 230 and further movement along the cyclonic flow path within the second drum 240 will further separate the intertwined portion of the second potato 51.

Figure 10A:
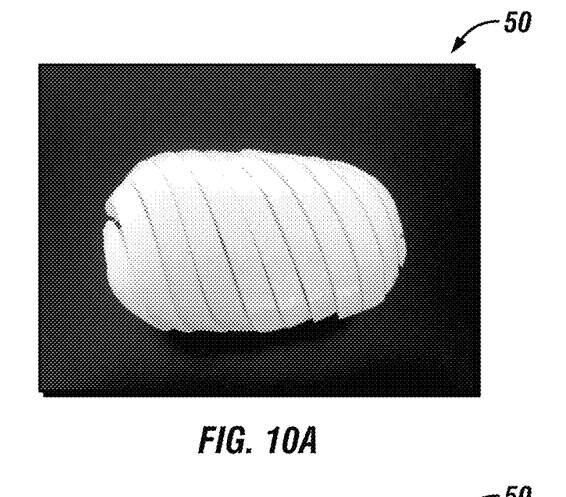
FIGS. 10A-10D show sequential views of a cut food product separating into a plurality of food product pieces.
Figure 10B:
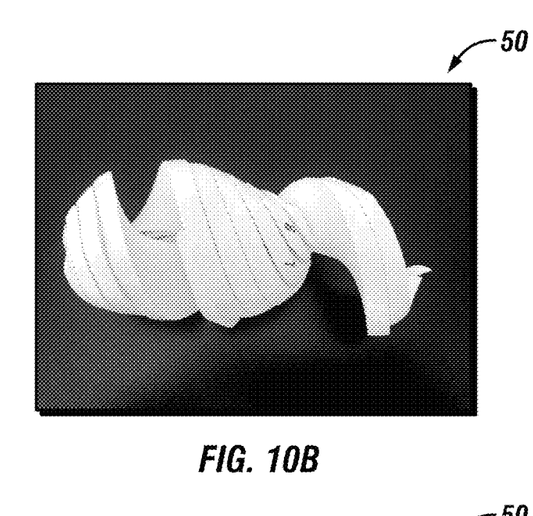
Figure 10C:
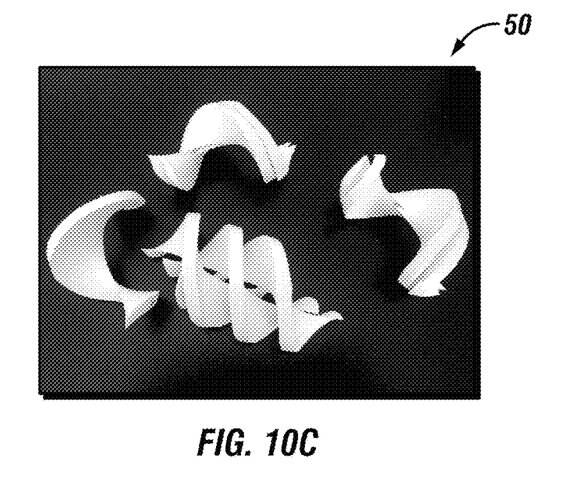
Figure 10D:
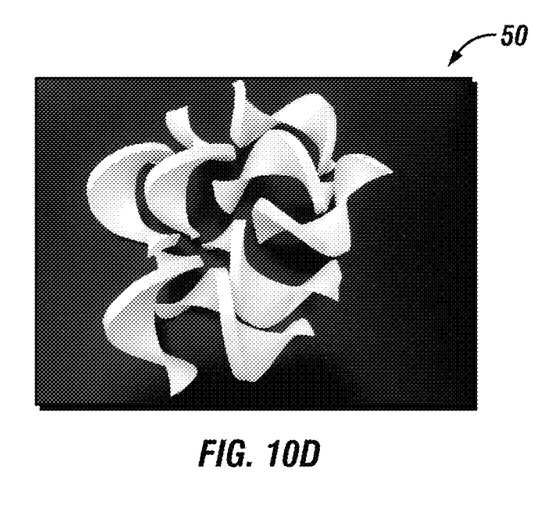

FIGS. 10A-10D show sequential views of a cut food product, such as a potato 50, separating into a plurality of food product pieces as it travels through the cyclonic flow path of the denester 200. In FIG. 10A, the potato 50 has been cut into a plurality of food product pieces which are intertwined around one another and ready to be introduced into the denester 200. In FIG. 10B, some of the food product pieces have started to unwind from other food product pieces by rotation relative to the other food product pieces as the potato 50 travels through the cyclonic flow path. In FIG. 10C, the potato 50 has traveled further through the cyclonic flow path and further unwound into multiple subsets of food product pieces, but some food product pieces remain intertwined with other food product pieces. In FIG. 10D, after further travel through the cyclonic flow path, the plurality of food product pieces of the potato 50 have completely unwound from each other.

FIGS. 6-8B show an embodiment of a denester 300 positioned to receive water and cut food products from a water knife 10. The denester 300 includes a first drum 310 and a second drum 340 with a passageway 330 therebetween. The first drum 310 includes a first end 311, a second end 312, and a flow inlet 301 that receives water and the food products from the water knife 10 via a discharge 11 (best shown in FIGS. 7A-7B). The second drum 340 includes a first end 341, a second end 342, and a flow outlet 302 that discharges water and separated food product pieces from the second drum 340 into an ancillary flow path 20. The discharge 11 of the water knife 10 and the flow outlet 302 of the second drum 340 may be aligned along the same axis 303.

Figure 6:
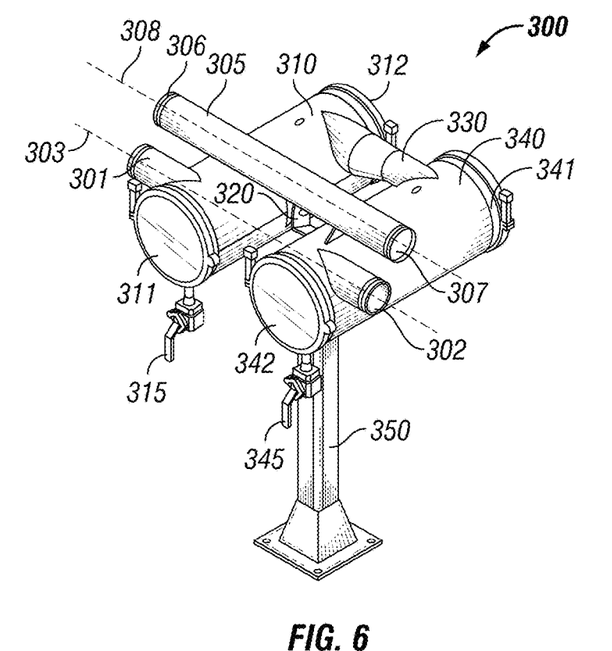
FIG. 6 shows an embodiment of a denester.
Figure 7A:
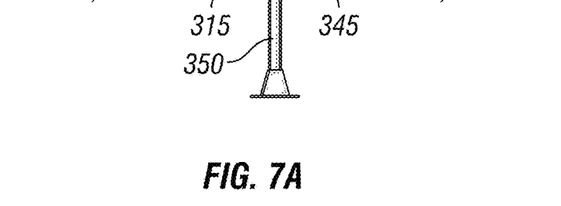
FIGS. 7A and 8A show the embodiment of FIG. 6 in a bypass position.
Figure 7B:
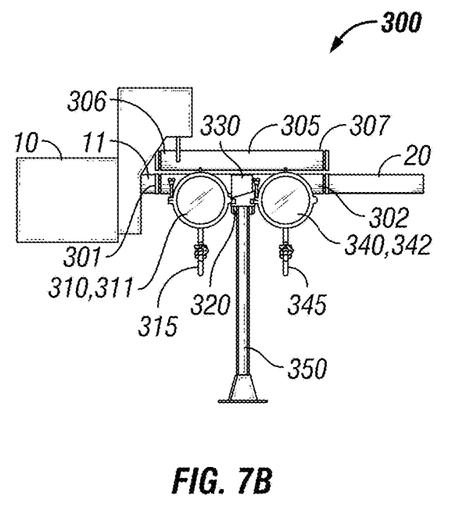
FIGS. 7B and 8B show the embodiment of FIG. 6 in an engaged position.
Figure 8A:
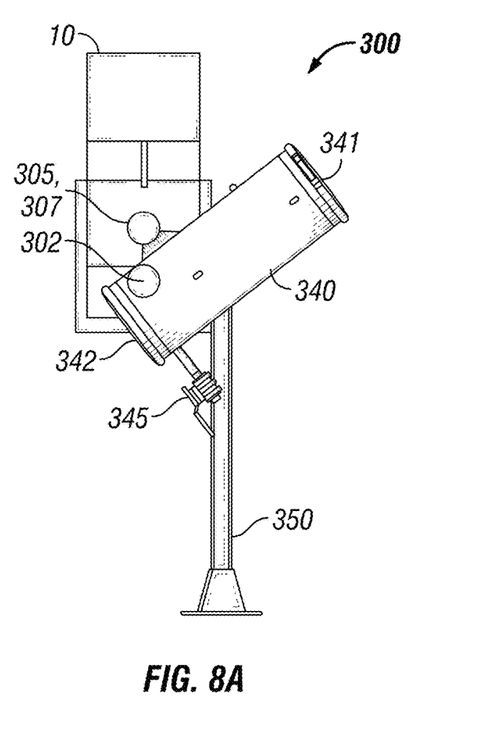
Figure 8B:
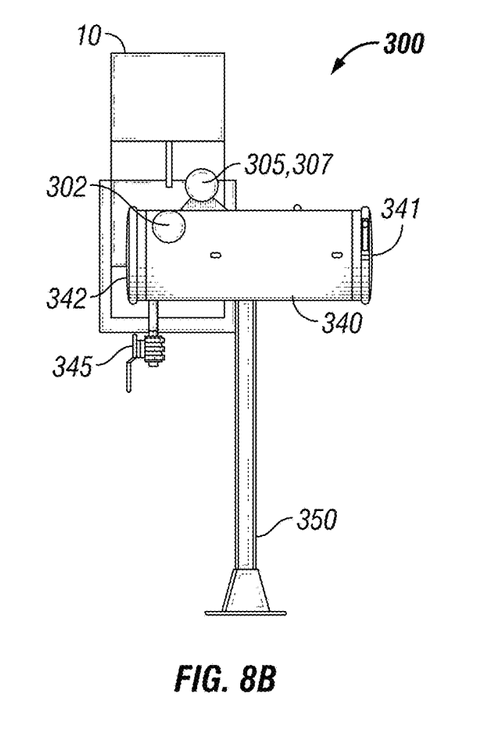

The denester 300 includes a passageway 330 extending from the second end 312 of the first drum 310 to the first end 341 of the second drum 340. A portion of the passageway 330 near the first drum 310 is oriented tangentially to the interior diameter of the first drum 310. A portion of the passageway 330 near the second drum 340 is oriented tangentially to the interior diameter of the second drum 340. The passageway 330 is tapered toward the second drum 340 such that water flowing through the passageway 330 must pass through a smaller cross-sectional area and the velocity of the flow is increased. The increased flow velocity increases the centripetal acceleration experienced by the cut food product within the second drum 340. The flow inlet 301, flow outlet 302, first drum 310, second drum 340, and passageway 330 form a denester fluid flow path.

The denester 300 includes a first drain valve 315 in fluid communication with the first drum 310 and a second drain valve 345 in fluid communication with the second drum 340. When the denester 300 is not in operation, the first drain valve 315 may be opened to drain any water from within the first drum 310 and the second drain valve 345 may be opened to drain any water from the second drum 340.

Figure 9A:
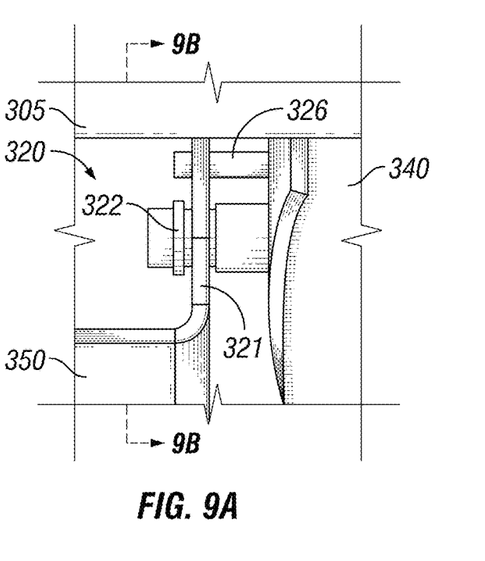
FIG. 9A shows a detailed view of a pivot connection of the embodiment of FIG. 6.
Figure 9B:
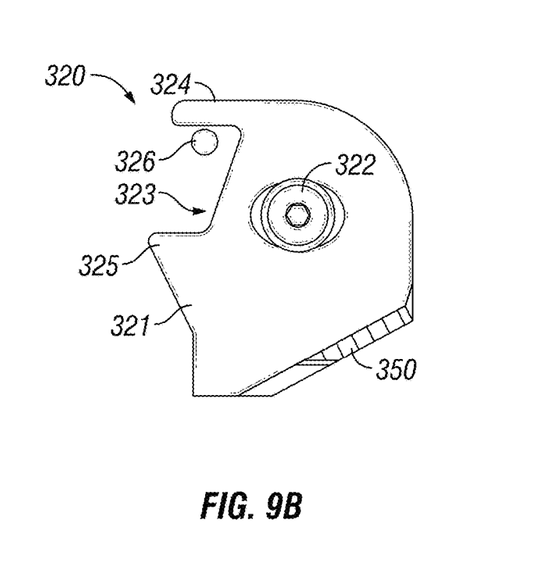
FIG. 9B shows a cross-sectional view of FIG. 9A.

The denester 300 includes a bypass flow path 305 having a bypass inlet 306 and a bypass outlet 307. The bypass inlet 306 and bypass outlet 307 may be aligned along the same axis 308. The axis 308 associated with the bypass flow path 305 and the axis 303 associated with the flow inlet 301 and flow outlet 302 may be parallel axes. In some embodiments, the bypass inlet 306 and bypass outlet 307 may not be aligned along the same axis 308, but the bypass inlet 306 and the flow inlet 301 may be relatively positioned in the same manner as the bypass outlet 307 and flow outlet 302. In pivoting embodiments, the flow inlet 301 and the bypass inlet 306 may be equidistantly located from the pivot point within their plane of movement. Also, the flow outlet 302 and bypass outlet 307 may be equidistantly located from the pivot point within their plane of movement. The denester 300 is supported upon a frame 350 with a pivot connection 320. The pivot connection 320 enables the first drum 310 and the second drum 340 to be pivoted between a bypass position (shown in FIGS. 7A and 8A) and an engaged position (shown in FIGS. 7B and 8B). An embodiment of a pivot connection 320 is shown in FIGS. 9A and 9B. The pivot connection 320 includes a plate 321 fixedly connected to the frame 350. The second drum 340 is supported upon a bearing 322, such as an Acetal bearing, that enables rotational motion of the second drum 340 with respect to the plate 321. The plate 321 may include a recess 323 bounded by a first side 324 and a second side 325. The denester 300 may include a stop pin 326 that extends from the second drum 340 or a frame portion into the recess 323. Although FIGS. 9A and 9B show only the pivot connection 320 with respect to the second drum 340, it is appreciated that first drum 310 may be pivotally connected in a similar manner.

In operation, the denester 300 might be pivoted between its bypass position and its engaged position. In the bypass position shown in FIGS. 7A and 8B, the discharge 11 of the water knife 10 is in communication with the bypass inlet 306 of the bypass flow path 305 and the bypass outlet 307 of the bypass flow path 305 is in communication with the ancillary flow path 20. A food product, such as a potato, is cut by the water knife 10 and continues through the discharge 11, into the bypass inlet 306 and then through the bypass outlet 307 of the bypass flow path 305, and into the ancillary flow path 20 for further processing. In the bypass position, the stop pin 326 is positioned against the first side 324 of the plate 321 (shown in FIG. 9) to prevent further rotation. In this configuration, a first set of food products, such as straight-cut fries may bypass the first drum 310 and the second drum 340 of the denester 300. By way of example, the bypass position may be desirable for cuts where it is desirable to minimize turbulence in order to prevent damage to the food products.

Once the first set of food products has been cut, a cutting head within the water knife 10 may be changed to cut and separate a second set of food products, such as twisted wedges. The denester 300 is pivoted to its engaged position (shown in FIGS. 7B and 8B). In the engaged position, the flow inlet 301 of the first drum 310 is aligned and in communication with the discharge 11 of the water knife 10 and the flow outlet 302 of the second drum 340 is aligned and in communication with the ancillary flow path 20. In the engaged position, the stop pin 326 (shown in FIG. 9B) is positioned adjacent to the second side 325 of the plate 321. In this position, the second set of food products can travel through the first drum 310 and the second drum 340 to be separated. Once cutting has been complete, the drain valves 315 and 345 may be operated in order to remove water within the first drum 310 and the second drum 340. Such drain valves 315 and 345 may be particularly desirable when the flow inlet 301 and/or the flow outlet 302 are positioned on a top portion of the first drum 310 and the second drum 340 as shown. In addition, the denester 300 may be pivoted to the bypass position to assist with draining the first drum 310 and the second drum 340. It is anticipated that in some embodiments, the orientation of the first drum 310 and the second drum 340 in the bypass position and the engaged position may be reversed. For example, the first drum 310 and the second drum 340 may have a horizontal orientation in the bypass position and have an angled orientation in the engaged position. In addition, in some embodiments, at least one of the drums 310, 340 could operate in a vertical orientation or angled orientation and the flow of the water would oppose gravity.

A variety of modification and combinations of these embodiments will be understood by those skilled in the art having the benefit of this disclosure. For example, the first drum and the second drum could be combined or oriented along the same longitudinal axis. Also for example, more than two drums could be used and/or the drums could be of varying sizes. Furthermore, the direction of rotation may be changed between drums in some embodiments. In some embodiments, the flow inlet and the flow outlet may be positioned on a top portion of the first drum and the second drum. In other embodiments, the flow inlet and the flow outlet may be positioned on a bottom portion of the first drum and the second drum. In still other embodiments, the flow inlet and the flow outlet may be positioned within different planes. In some embodiments, the denester may be moveable in another manner to permit orientation of a bypass flow path with the discharge of the water knife in place of the fluid flow path of the denester. For example, the bypass inlet and bypass outlet may be oriented perpendicular to the flow inlet and flow outlet and the denester may be rotated 90 degrees to align the bypass flow path.

Additionally, it is appreciated that a reduction in the interior diameter of a drum increases the centripetal acceleration within the drum. More robust cuts may be separated using drums of smaller interior diameter than less robust cuts. Likewise, it is appreciated that an increase in the volumetric flow rate increases centripetal acceleration within the drum. More robust cuts may be separated using higher volumetric flow rates than less robust cuts. Additionally, the size of the cut food product pieces relative to the interior diameter of the drum(s) may affect throughput and determine whether a blockage is likely to be formed. In addition, it is also foreseeable that the embodiments described herein may be applicable to the separation of non-food products as well.

Although this disclosure has been described in terms of certain preferred embodiments, other embodiments that are apparent to those of ordinary skill in the art, including embodiments that do not provide all of the features and advantages set forth herein, are also within the scope of this disclosure.

What is claimed is:

1. A system for separating a cut food product, having a plurality of nested food product pieces, into a plurality of food product pieces, the system comprising:
   a flow inlet for receiving the cut food product having the plurality of nested food product pieces, the flow inlet is in fluid communication with a discharge of a knife block or a water knife;
   a flow outlet; and
   at least one drum connecting the flow inlet and the flow outlet, wherein the flow inlet is oriented to direct the cut food product tangentially into the at least one drum, and the flow inlet and the flow outlet are positioned to create a cyclonic flow path through the at least one drum, the system including a passageway extending from a first end of the passageway to a second end of the passageway along the cyclonic flow path, the passageway includes a tapered section between the first end and the second end that narrows toward the second end, wherein the system does not include any moving parts within the cyclonic flow path through the at least one drum.

2. The system of claim 1, wherein the cyclonic flow path is configured to impart turbulence and centripetal acceleration to a cut food product having a plurality of nested food product pieces received through the flow inlet and separate the plurality of nested food product pieces into a plurality of food product pieces, substantially each of which are individually separated from one another.

3. The system of claim 1, wherein the flow inlet is oriented to direct the cut food product into the at least one drum at a right angle to a longitudinal axis of the at least one drum.

4. The system of claim 3, wherein the flow inlet is positioned on a top portion of the at least one drum.

5. The system of claim 1, wherein the at least one drum is a plurality of drums including a first drum and a second drum, the flow inlet being positioned on the first drum and the flow outlet being positioned on the second drum, the flow inlet being tangential to an inner diameter of the first drum, and the passageway providing fluid communication from the first drum to the second drum, the first end connected to the first drum and the second end connected to the second drum, the second end of the passageway being tangential to an inner diameter of the second drum.

6. The system of claim 5, wherein the flow inlet is aligned with the flow outlet.

7. The system of claim 5, wherein the first drum has an inner diameter of approximately twelve inches.

8. The system of claim 7, wherein the first drum has a length of approximately twenty-four inches.

9. The system of claim 5, wherein the first drum includes a first drain valve and the second drum includes a second drain valve.

10. The system of claim 1, wherein the at least one drum has a longitudinal axis that is perpendicular to gravitational forces.

11. A system for separating a cut food product, having a plurality of nested food product pieces, into a plurality of food product pieces, the system comprising:
- a flow inlet for receiving the cut food product having the plurality of nested food product pieces, the flow inlet is in fluid communication with a discharge of a knife block or a water knife;
- a flow outlet; and
- at least one drum connecting the flow inlet and the flow outlet, wherein the flow inlet is oriented to direct the cut food product tangentially into the at least one drum, and the flow inlet and the flow outlet are positioned to create a cyclonic flow path through the at least one drum, the system including a passageway extending from a first end of the passageway to a second end of the passageway along the cyclonic flow path, the passageway includes a tapered section between the first end and the second end that narrows toward the second end; and
- a bypass flow path having a bypass inlet and a bypass outlet, wherein the system is pivotable between a first position and a second position, the flow inlet being aligned with the discharge in the first position and the bypass inlet being aligned with the discharge in the second position.

12. A system for separating a cut food product, having a plurality of nested food product pieces, into a plurality of food product pieces, the system comprising:
- a plurality of drums, including a first drum and a second drum;
- a flow inlet positioned on the first drum, the flow inlet being configured to be placed into fluid communication with a discharge of a knife block or a water knife, the flow inlet being tangential to an inner diameter of the first drum;
- a flow outlet positioned on the second drum;
- a passageway providing fluid communication from the first drum to the second drum, the passageway having a first end connected to the first drum and a second end connected to the second drum, the second end of the passageway being tangential to an inner diameter of the second drum, the passageway includes a tapered section between the first end and the second end that narrows toward the second end; and
- a flow path extending from the flow inlet to the flow outlet through the plurality of drums, wherein the flow path is configured to impart turbulence and centripetal acceleration to a cut food product having a plurality of nested food product pieces received through the flow inlet, wherein the system does not include any moving parts within the flow path through the plurality of drums.

13. The system of claim 12, wherein the flow path is configured to separate the plurality of nested food product pieces into a plurality of food product pieces, substantially each of which are individually separated from one another.

14. The system of claim 12, wherein the flow inlet is in fluid communication with a discharge of a knife block or a water knife.

* * * * *